Sept. 1, 1970   A. HILL   3,526,742
STUD WELDING
Filed Jan. 9, 1967   4 Sheets-Sheet 1
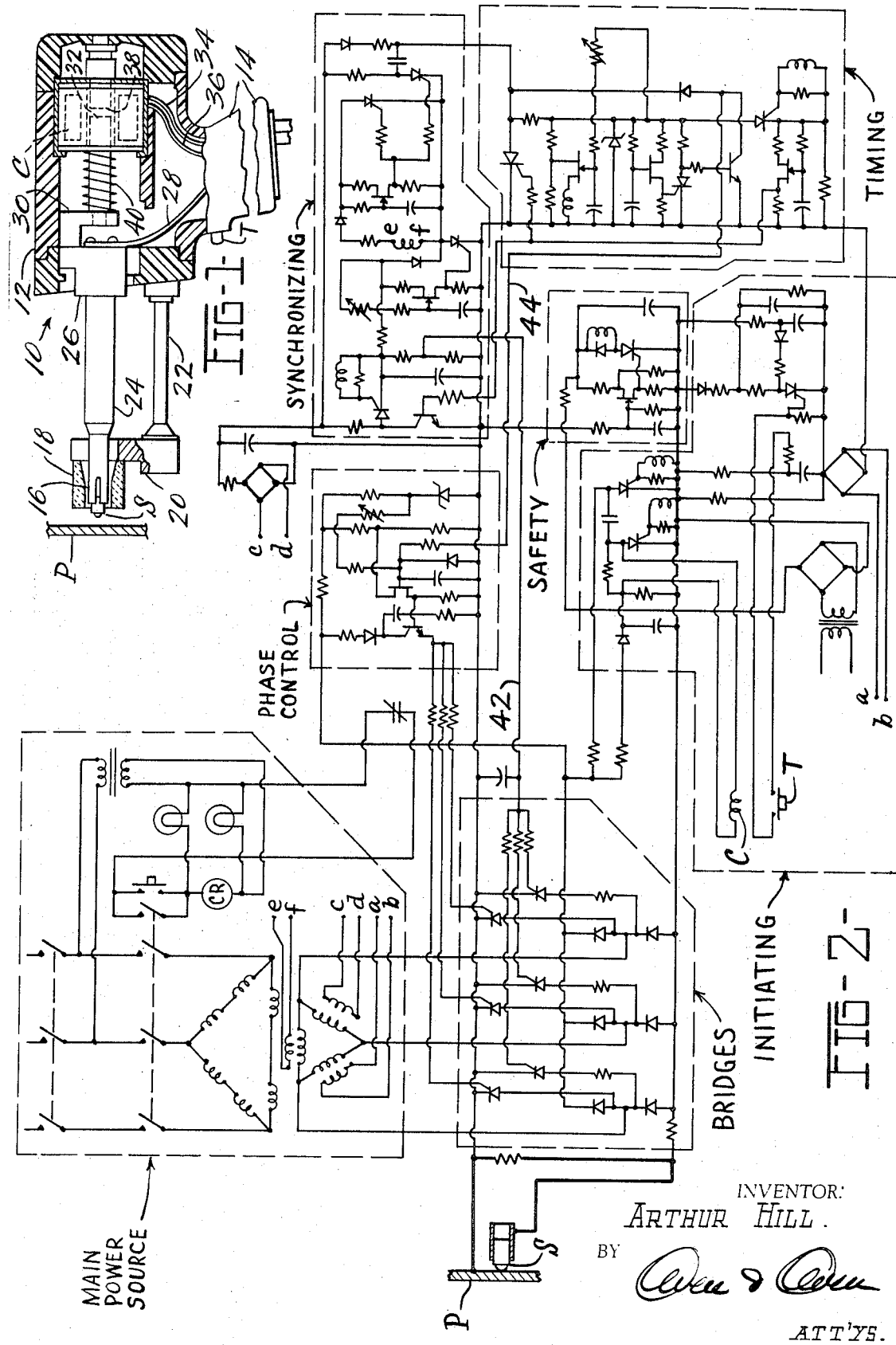

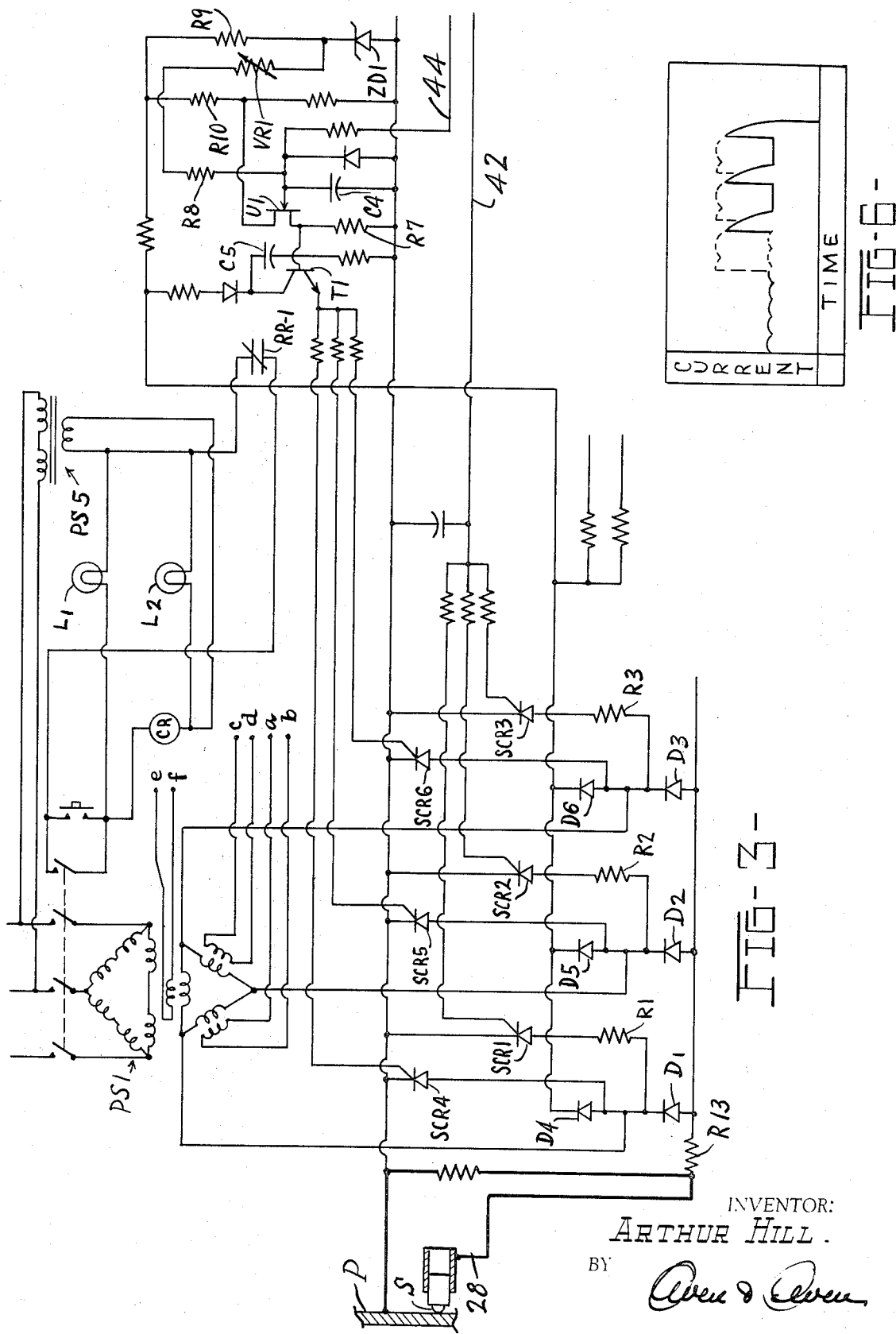

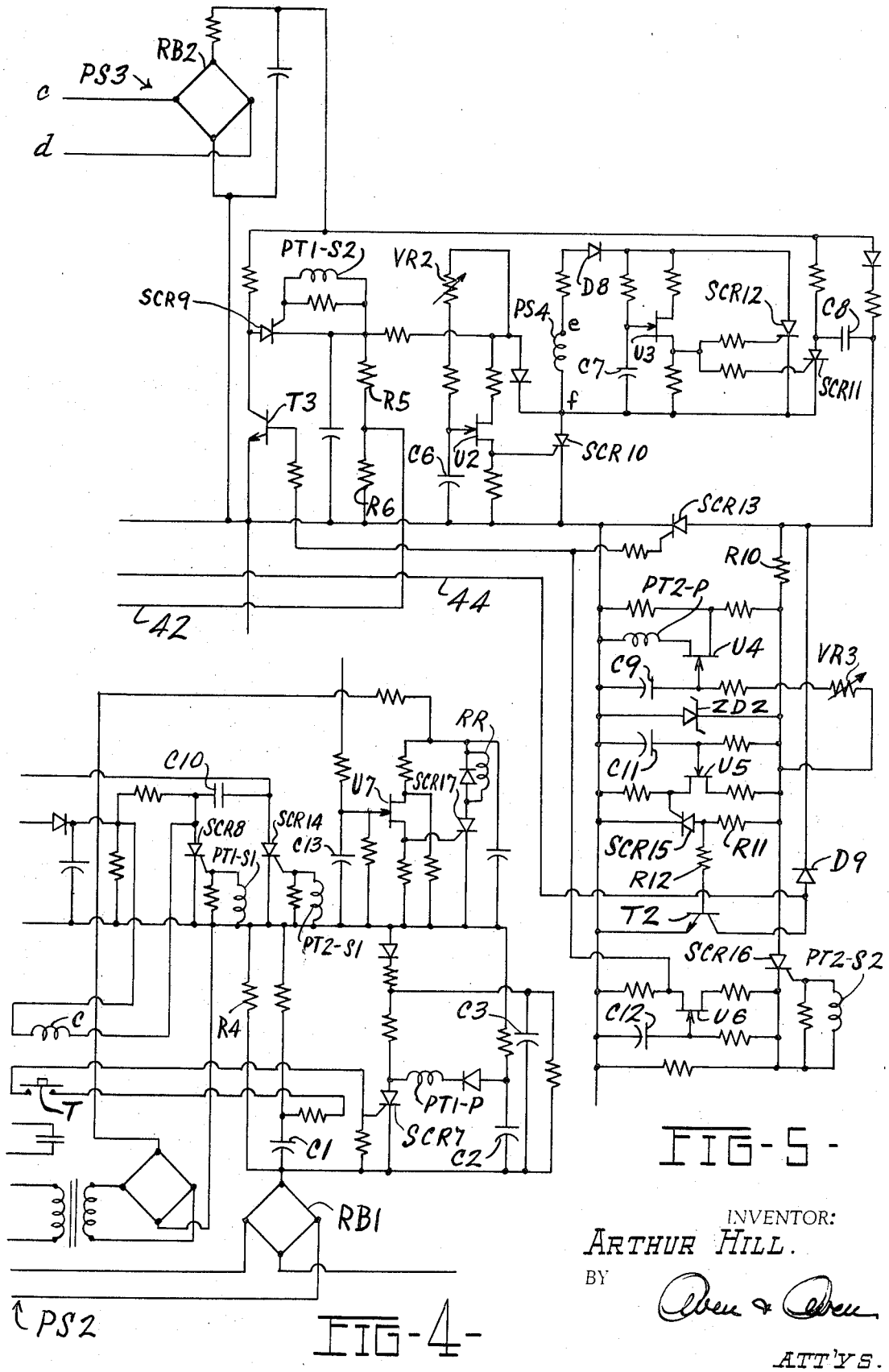

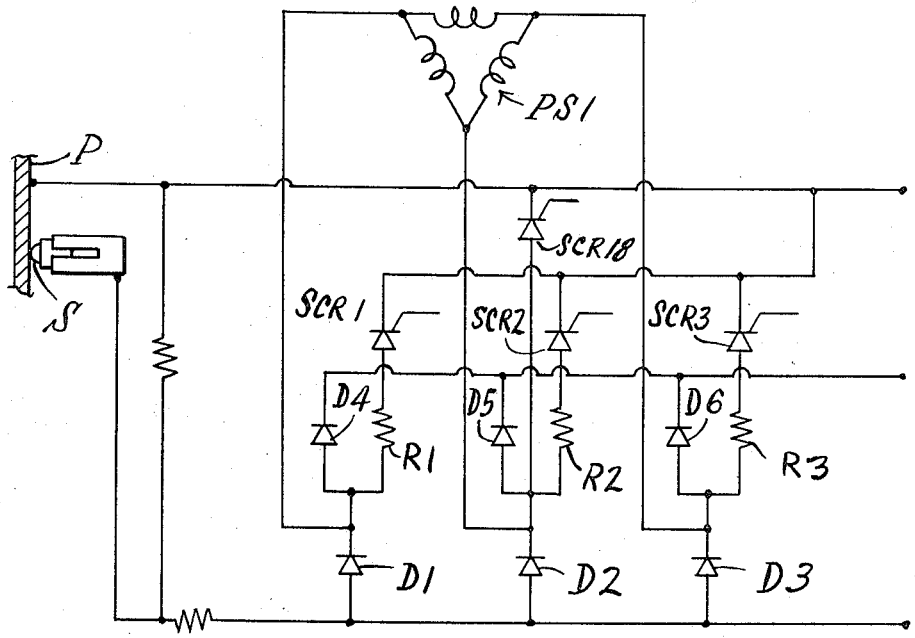
FIG-7-
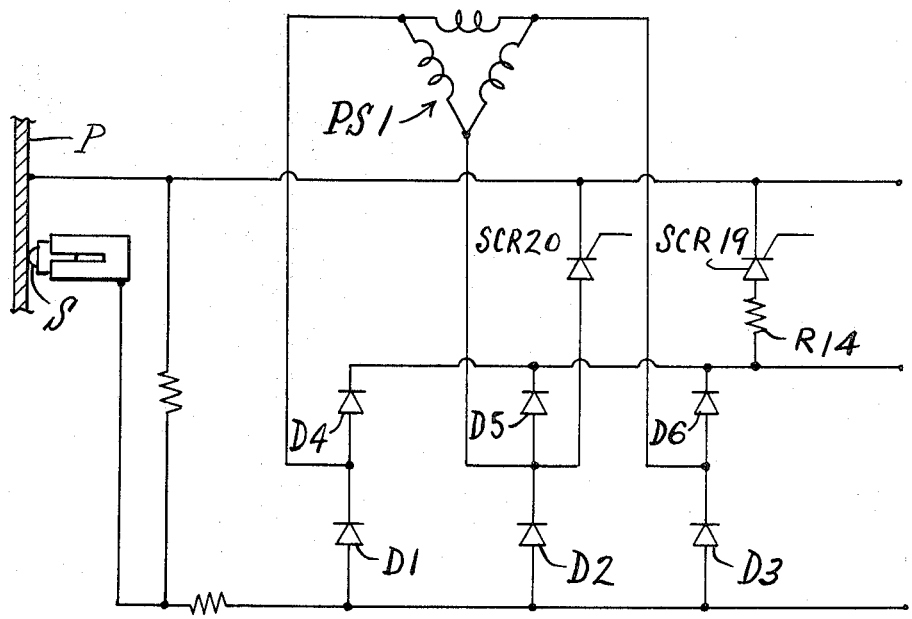
FIG-8-
INVENTOR:
ARTHUR HILL.
BY
ATT'YS.

United States Patent Office 3,526,742
Patented Sept. 1, 1970

3,526,742
STUD WELDING
Arthur Hill, North Olmsted, Ohio, assignor, by mesne assignments, to TRW Inc., Cleveland, Ohio, a corporation of Ohio
Filed Jan. 9, 1967, Ser. No. 607,960
Int. Cl. B23k 9/20
U.S. Cl. 219—98
3 Claims

ABSTRACT OF THE DISCLOSURE

This invention relates to stud welding apparatus and a circuit preferably utilizing a three-phase power source which enables the welding of studs over a wider range of sizes than heretofore achieved with the one circuit being suitable for welding studs ranging from small trim studs to studs one-half inch in diameter. The welding circuitry includes three bridges which employ certain diodes in common. One bridge supplies power for welding tool controls and for a phase control circuit for a main welding arc. A second bridge supplies power for a pilot arc and the third bridge supplies power for the main welding arc as regulated by the phase control circuit. The welding arc of the stud welding cycle can be closely controlled both by phase shift and by the number of cycles the welding arc is maintained to provide the close control and a wide variation in intensity and length of welding arc which enables welding of studs of a wide variation in size. The invention also contemplates a circuit for synchronizing the welding arc in relation to the power supply and also includes a unique safety circuit in case of breakdown of certain solid state components.

BACKGROUND OF THE INVENTION

Rectified AC power sources have heretofore been used to a limited extent in welding. Apparatus employing such power sources have, however, had relatively limited applications.

SUMMARY OF THE INVENTION

The present invention preferably employs a three-phase power source in combination with three bridges, all three bridges having three rectifiers or diodes in common, with twelve rectifiers being all that is necessary for the three bridges. One of the bridges supplies power for controlling the retraction of the stud during the welding cycle and also supplies power for a phase control circuit. Another of the bridges supplies power for the pilot arc which includes solid state switch means or semiconductor controlled rectifiers which are on or keyed for the entire welding cycle. The third bridge also includes solid state switch means or semiconductor controlled rectifiers which are sequentially keyed and phase controlled to enable close control over the intensity of the welding arc. Solid state timing circuits are also employed to determine the length of the welding arc and a synchronizing circuit used to initiate the welding arc at a particular time in relation to the phase of the power employed. The latter circuit aids in enabling the determination and selection of the exact number of cycles during which the welding arc will be maintained between the stud and the workpiece, whereas the phase control determines that portion of each cycle in which the welding arc is established.

It is, therefore, a principal object of the invention to provide a power supply and controls for stud welding apparatus to enable a wide variety of sizes of studs to be welded.

Another object of the invention is to provide an AC power source for stud welding which incorporates bridges employing certain common solid state components for each bridge.

Yet another object of the invention is to provide a stud welding circuit by means of which a main welding arc of a stud welding cycle can be closely controlled as to both intensity and time.

Still a further object of the invention is to provide a stud welding circuit with a unique safety circuit.

BRIEF DESCRIPTION OF THE DRAWING

Numerous other objects and adanvtages of the invention will be apparent from the following detailed description of a preferred embodiment thereof, reference being made to the accompanying drawings, in which:

FIG. 1 is a somewhat schematic view in longitudinal cross section of a stud welding tool which can be employed with the invention;

FIG. 2 is a diagrammatic view of the overall stud welding circuit embodying the invention;

FIG. 3 is an enlarged view of a portion of the circuit showing a power supply, three bridges connected therewith, and a phase control circuit for the main welding arc;

FIG. 4 is an enlarged view of a stud control portion of the circuit and a safety circuit;

FIG. 5 is an enlarged view of timing control circuits for the pilot arc, the main welding arc, the study plunge, and a synchronizing circuit for the main welding arc;

FIG. 6 is a graph representing a welding cycle achieved with the apparatus according to the invention; and FIGS. 7 and 8 are diagrammatic views of modifications of certain portions of the circuit of FIG. 2.

DESCRIPTION OF THE PREFERRED EMBODIMENT

Welding tool

Referring to FIG. 1, a stud welding tool with which the invention can be employed is indicated at 10 and can be of a known design, requiring no special components to enable practice of the present invention. The tool 10 includes a main housing or body 12 of suitable dielectric material having a handle 14 depending therefrom. A chuck 16 is located at the forward end of the tool and has a plurality of fingers which receive and resiliently hold a stud S when being welded to a workpiece P. For high rates of welding, the studs can be fed to the chuck from the rear by a feeding system such as that shown in a U.S. patent application to Spisak, Ser. No. 358,736.

A suitable spark shield 18 is located around the chuck 16 and the stud S. The shield is positioned so that the end of the stud protrudes slightly beyond the shield prior to the stud being pressed against the workpiece. This assures that the stud is initially in good electrical contact with the workpiece, when the spark shield is placed against it, prior to welding. The spark shield 18 is held in the desired position by a supporting foot 20, which, in turn, is supported from the front end of the body 12 by a pair of adjustable legs 22. These can be moved somewhat into or out of the body 12 to adjust the end of the spark shield 18 relative to the end of the stud S. Rather than a permanent spark shield, a temporary or disposable spark shield can be employed, such a shield being better known in the art as a ferrule.

The stud chuck 16 is attached to a chuck leg 24 which is electrically connected by a cable clamp 26 to a main welding cable 28. A rear cable clamp part 30 has a solenoid core 32 extending rearwardly therefrom into a lifting and holding coil designated C. The core is pulled into the coil C when power is applied thereto through suitable leads 34 and 36. An adjustable stop 38 at the rear of the coil C can be employed to detremine the extent to which the core moves into the coil and, hence, the extent to which the stud is retracted from the workpiece during the welding cycle. During retraction, a pilot arc is established between the stud and the workpiece. After the stud has been fully retracted and the current to the coil C has been shut off, a return or plunge spring 40 moves the chuck back toward the workpiece and plunges the stud against the workpiece after a main welding arc has been established therebetween.

In the operation of the welding tool 10, the weldable end of the stud S is placed in contact with the workpiece and pressed thereagainst, compressing the spring 40 slightly, until the end of the spark shield 18 contacts the workpiece P. When the trigger is pulled, the coil C is energized and the stud S is withdrawn a predetermined distance from the workpiece by the retraction of the core 32. At the same time, a potential is established between the stud S and the workpiece P so that a pilot arc is drawn between the two and the stud is retracted. After a period of time, the current to the coil C is shut off, enabling the plunge spring to move the chuck 16 back toward the workpiece and cause the weldable end of the stud S to contact the workpiece. Before the engagement of the stud and the workpiece, a main welding arc is established therebetween. The main welding arc can be initiated before or after the plunge stroke of the stud begins, depending upon the length of the welding arc, which depends to a large extent upon the size of the stud being welded. Larger studs generally require a main welding arc of longer duration than smaller studs, although other factors also influence the length of the main welding arc to some extent. The main welding arc preferably is maintained substantially until the stud plunges against the workpiece to assure that metal melted by the main welding arc will not solidify prior to the contact.

Power source and bridges

Referring now more particularly to FIGS. 2 and 3, a power source PS1 is shown in the form of a three-phase transformer which preferably has an output of 220 or 440 volts. Three-phase power is preferred for the pilot arc and welding arc although single phase power can be employed for the main welding arc. Three bridges are connected with the power supply, with three rectifiers or diodes D1, D2, and D3 being common to all three bridges. Three additional diodes D4, D5, and D6 complete one of the three bridges and provide fully rectified power for the welding controls which initiate operation of the welding tool coil. This bridge also supplies power for a phase control circuit to be discussed subsequently.

A second bridge is formed with the diodes D1, D2, and D3 in combination with three solid state switch means or semiconductor controlled rectifiers SCR1, SCR2, and SCR3. The three silicon controlled rectifiers are gated and controlled to supply power for the pilot arc of the welding cycle with resistors R1, R2, and R3 determining the intensity of the pilot arc. In the second bridge, the silicon controlled rectifiers are keyed for the entire welding operation from the time the stud begins to retract from the workpiece substantially to the time that it contacts the workpiece again. This is necessary to maintain continuity of the welding arc, when established, which may not otherwise be continuous throughout its duration, according to the phase control employed, as will be discussed subsequently. The pilot arc will be substantially constant, being supplied by fully rectified three-phase power, with a slight variation in intensity due to the slight variation in the peaks of the three-phase rectified waves.

The third bridge is formed with three solid state switch means or semiconductor controlled rectifiers SCR4, SCR5, and SCR6 in combination with the diodes D1, D2, and D3. These three silicon controlled rectifiers are gated and phase controlled in a manner to establish the main welding arc during the welding cycle. Single phase power can be used for the welding arc, if desired.

Stud retraction and pilot arc

The remaining portions of the circuit will be discussed in relation to their sequence in the welding cycle. The cycle cannot begin until the stud is in electrical contact with the workpiece. With the stud placed with an end against the workpiece, a voltage is established across a resistor R4 and a capacitor C1 (FIG. 4) which is then connected with a power source PS2 which can be 24 v. AC, for example, and taken off a suitable secondary winding of the three-phase transformer PS1 through termials a, b. This voltage is rectified by a full-wave rectifier bridge RB1. If a switch or trigger T of the welding tool is then closed, the capacitor C1 is connected with and keys a silicon controlled rectifier SCR7. A second capacitor C2 thereby discharges through a primary winding PT1–P of a first pulse transformer which initiates retraction of the stud and the pilot arc. A third capacitor C3 maintains the rectifier SCR7 keyed for a period of time sufficiently long to prevent the possibility of repulsing of the primary PT1–P by repeated closing of the trigger T before a weld cycle is completed.

The first pulse transformer has a first secondary PT1–S1 (FIG. 4) which is energized when the primary is pulsed and keys a silicon controlled rectifier SCR8. When keyed, this rectifier connects the welding tool coil C across the first bridge and energizes the coil C to cause the stud to retract from the workpiece.

The first pulse transformer has a second secondary PT1–S2 (FIG. 5) which, when pulsed, keys a silicon controlled rectifier SCR9. This is connected with a power source PS3, which can constitute a secondary of the three-phase transformer PS1 connected through terminals c, d. The power source is supplied through a full-wave bridge RB2 and also is filtered. With the rectifier SCR9 keyed, the power source is connected with the gates of the three silicon controlled rectifiers SCR1, SCR2, and SCR3. This circuit is made through a line 42 and two resistors R5 and R6 and through three compensating resistors in series with the gates of the three rectifiers SCR1, SCR2, and SCR3. The power is supplied to the gates of these three silicon controlled rectifiers for the remainder of the welding cycle, as long as the silicon controlled rectifier SCR9 is keyed. These rectifiers connect the three-phase power source across the stud and the workpiece through the resistors R1, R2, and R3, and establish the pilot arc as the stud is retracted. As shown in FIG. 6, the pilot arc varies slightly due to the peaks of the rectified three-phase power.

Welding arc (1) *Phase control.*—The main welding arc and welding current are phase-controlled through a phase control circuit (FIG. 3) which controls the keying of the silicon controlled rectifiers SCR4, SCR5, and SCR6. These three rectifiers are keyed simultaneously but only one conducts, which is associated with positive voltage of the three-phase power. Hence, while all three rectifiers are keyed simultaneously, only one of the three will be conducting, with the path of the power then being established through the workpiece and the stud and back to one of the other two rectifiers, depending upon which is the most negative. When the three rectifiers are keyed, the one conducts until the voltage thereacross drops to zero, in which instance it turns off with the other two already being off. Subsequently, during the next cycle, the rectifiers are simultaneously keyed again and a second one will then conduct until the voltage thereacross drops to zero. The rectifiers will be keyed again during the next cycle and the third one will conduct until the voltage thereacross drops to zero. Thus, in three cycles, each of these silicon controlled rectifiers will conduct once.

Since it is possible, because of the phase control firing of the silicon controlled rectifiers, that there may be intervals when none are conducting, it is necessary to maintain an arc through the pilot arc rectifiers SCR1, SCR2, and SCR3. Hence, it is important that the pilot arc rectifiers be keyed during the welding cycle to maintain the welding arc since, if extinguished, it cannot be readily re-established with the stud and the workpiece spaced apart. With the arrangement shown, one of the six rectifiers SCR1–SCR6 will always be conducting. If the rectifier SCR4 is on, SCR1 will be off, and vice versa. The same is true for rectifiers SCR5 and SCR2, and SCR6 and SCR3. Both pair can be off simultaneously, too. However, one of the six silicon controlled rectifiers will always be conducting, with the other five off, and an arc will always exist during the welding cycle.

In the phase control circuitry, the voltage differential between the cathodes of diodes D4, D5, and D6 and the cathodes of rectifiers SCR1–SCR6 is applied across the circuit (FIG. 3). The magnitude of this voltage will depend upon whether the stud is in contact with the workpiece, whether a pilot arc is established, and also on whether the main welding arc is established. If a voltage exists, a constant voltage is developed across a Zener diode ZD1. The constant voltage established by the Zener diode ZD1 is applied across a capacitor C4 which begins to charge to the voltage level of the Zener diode. The capacitor C4 then fires a unijunction transistor U1 at a particular time and supplies a pulse across a resistor R7 and through a transistor T1. The three rectifiers SCR4, SCR5, and SCR6 are then keyed through three compensating resistors. The instant one of these rectifiers begins to conduct, the voltage across the circuit drops to zero. The conducting rectifier will continue to conduct, however, until the positive voltage applied to the anode drops to zero, or until the three rectifiers are triggered again. Because the voltage appearing across the phase control circuitry drops to zero, it is important that the pulse applied to the three rectifiers be sufficient to key them. For this purpose, an additional capacitor C5 can be employed also to discharge through the transistor T1.

The rate of charging of the capacitor C4 and, hence, the time at which the rectifiers SCR4, SCR5, and SCR6 are keyed, can be controlled through a resistor R8 by a variable resistor VR1 which can be controlled, in turn, by the operator to determine the intensity of the welding arc. When the resistance set by resistor VR1 is high, the charging time of the capacitor C4 is long and the rectifiers will be turned on later to increase the off time between the pulses and decrease the intensity of the arc (FIG. 6). On the other hand, when the resistance of the variable resistor VR1 is decreased to a low value, the capacitor C4 will charge rapidly and the pulses establishing the main welding arc will be almost continuous, as shown in dotted lines in FIG. 6.

The phase control circuitry also automatically adjusts for a drop in line voltage. The voltage applied across a resistor R9 and the Zener diode ZD1, to the base of the unijunction transistor U1 through a resistor R10 is related to line voltage. If the voltage drops, the unijunction transistor will be keyed earlier in the cycle because the base voltage will be lower and with the intrinsic stand-off ratio constant, the firing voltage will be lower. The voltage compensation is independent of the variable resistor VR1 and will compensate for a voltage drop unless, of course, the variable resistor VR1 is set to charge the capacitor C4 at the maximum rate, at which time the transistor T1 will key the rectifiers SCR4, SCR5, and SCR6 as early as possible regardless of the line voltage.

(2) *Synchronization of main welding arc.*—The phase control circuitry, and, hence, the initiation of the main welding arc, is controlled by a clamp established through a conductor 44 which prevents the capacitor C4 from charging and, hence, keying the unijunction transistor U1 until the clamp is removed. The removal of the clamp and subsequent initiation of the main welding arc should be synchronized with the three-phase power to enable accurate and consistent timing of the main welding arc. This is achieved through a welding arc synchronizing circuit, as shown in FIG. 5. In this circuit, the second secondary winding PT1–S2, which was keyed at the time the stud began to retract from the workpiece, also connects the third power source PS3 with a capacitor C6. This begins to charge at a rate controlled by a second variable resistor VR2. When this capacitor reaches a predetermined charge, it energizes a second unijunction transistor U2 which keys a silicon controlled rectifier SCR10. The keying of this silicon controlled rectifier, however, has no effect unless a silicon controlled rectifier SCR11, in series therewith, also is keyed, in which instance, the clamping circuit across the phase control circuit is removed but the clamp is transferred to another circuit for a predetermined period, as will be discussed subsequently.

To synchronize the welding arc and the three-phase power, an additional source of power PS4 in the form of a secondary winding connected with the main three-phase transformer through terminals *e, f* is employed to provide half-wave rectified power through a diode D8. This power causes a capacitor C7 to charge and fire a unijunction transistor U3 during each cycle and to key the silicon controlled rectifier SCR11. Since the base voltage of the unijunction transistor U3 is a function of the half-wave rectified supply voltage through the power source PS4 and the diode D8, the keying of the unijunction transistor U3 will be synchronized with the power phase and will key the rectifier SCR11 and remove the clamp from the phase control circuitry at a predetermined synchronized time in the current cycle. The rectifier SCR11 will remain conducting only if the rectifier SCR10 is also keyed. A rectifier SCR12 is keyed once every cycle and remains keyed until the half-wave rectified voltage drops to zero. This prevents the possibility of additional pulsing during the cycle of the rectifier SCR11. When keyed, the rectifier SCR11 connects a capacitor C8 to discharge across and turn off a silicon controlled rectifier SCR13. The synchronizing circuit can also be incorporated in the pilot arc initiating circuit to synchronize the pilot arc as well as the main welding arc with the power supply.

(3) *Welding arc and stud plunge timing.*—When the rectifier SCR13 is turned off, the clamping circuit for the phase control circuit through a diode D9 is broken, but a clamping circuit is maintained through a transistor T2 and resistor R10, R11, and R12. However, the welding arc timing circuit, as shown in FIG. 5, is rendered operative when SCR13 is turned off. Accordingly, a capacitor C9 begins to charge with the main voltage thereacross being regulated through a Zener diode ZD2 to provide a constant source of voltage for accurate timing. The rate at which the capacitor C9 charges is determined by a third variable resistor VR3. When the capacitor C9 reaches a predetermined charge, it keys a fourth unijunction transistor U4 and pulses a primary PT2–P of a second pulse transformer. This transformer has a first secondary PT2–S1 (FIG. 4) which causes the power to the welding tool coil C to be turned off. The secondary PT2–S1, when pulsed, keys a silicon controlled rectifier SCR14 which connects a capacitor C10 back across the rectifier SCR8, causing it to turn off and to disconnect the power from the coil C. This enables the plunger spring to begin the plunge stroke of the stud. The second pulse transformer also has a second secondary winding PT2–S2, to be discussed subsequently.

At the time the capacitor C9 begins to charge, another capacitor C11 (FIG. 5) also begins to charge, which fires a unijunction transistor U5 and turns on a silicon controlled rectifier SCR15. This causes the transistor T2 to remove the clamping path through the three resistors R10, R11, and R12. This removes all clamps and enables the welding arc to be initiated by the phase control circuit during the next cycle.

When the second secondary PT2–S2 (FIG. 5) of the second pulse transformer is pulsed, it keys a silicon controlled rectifier SCR16 which enables a capacitor C12 to charge and energizes a unijunction transistor U6. The capacitor C12 then energizes the rectifier SCR13 again to apply the clamp to the phase control circuitry and turn off the main welding arc a predetermined, variable time after it is initiated. The keying of the unijunction transistor U6 also turns off a transistor T3 which causes the rectifier SCR9 to turn off and reset the synchronizing portion of the cycle.

The main welding arc is started by the timing circuit consisting of the capacitor C11, the unijunction transistor U5, and the rectifier SCR15 which removes one clamping path, after the synchronizing circuit including the rectifiers SCR10 and SCR11 remove another clamping path. The stud plunge is determined by the variable timing circuit consisting of the capacitor C9, the unijunction transistor U4, and the pulse transformer PT2. The termination of the welding arc consists of this variable time delay circuit and one consisting of the capacitor C12 and the unijunction transistor U6.

By adjusting the variable resistor VR3, the termination of the arc of the main welding arc can be controlled so that the arc can consist of as little as one pulse to enable small studs to be welded to thin workpieces, for example, or an extended arc can be used for welding large diameter studs. The plunger stroke begins a period of time prior to the termination of the welding arc, which period can be made adjustable, if desired.

The variable resistor VR2 determines when the main welding arc will be initiated by controlling the rectifier SCR13 which, when non-conducting, removes one clamp and enables the capacitor C11 to charge to remove the second clamp of the phase control circuit to enable the main welding arc to be initiated at a predetermined time on the next current cycle, as determined by the rectifier SCR11 in combmination with the rectifier SCR10.

In summary, the variable resistor VR2 controls the length of the pilot arc time, and VR3 controls the length of time the main welding arc persists, while the variable resistor VR1 controls the intensity of the main welding arc.

A main resistor R13 (FIG. 3) can be employed in the main welding circuit to provide partial control of welding current in some instances. For the larger studs, the resistor R13 would not be used or would be substantially reduced. For small studs, particularly being welded to relatively thin workpieces with only a single pulse main welding arc used, again the resistor R13 would not be used or would be substantially reduced. Such a resistor only provides an approximate control over welding current and serves as a supplement, if desired, to the variable resistors which control length of the welding arc and arc intensity.

Safety circuit

With solid state controls, there is some possibility of danger in the event that the solid state components should fail. A capacitor C13 (FIG. 4) begins to charge during each welding cycle. In the event that one of the silicon controlled rectifiers SCR1–SCR6 should fail, the capacitor C13 will reach a predetermined charge after a period of time exceeding the length of a normal weld cycle and fire a unijection transistor U7 which keys a silicon controlled rectifier SCR17. This connects a relay RR with an auxiliary power source PS5 (FIG. 3) and opens normally-closed contacts RR1. A control relay CR is de-energized to open the contacts in the main line and completely disconnect the system. The relay remains energized through the auxiliary power source to prevent manual re-setting of the system. Suitable indicating lamps L1 and L2 show when the system is operating properly or when there is a malfunction.

Modified bridge circuits

FIG. 7 shows a slightly modified bridge circuit. In this instance, the same diodes D1–D6 supply the power for the tool control and the phase control circuits as before. The diode D2, in this instance, can be smaller than its counterpart in FIG. 3. The three rectifiers SCR1, SCR2, and SCR3 again supply pilot arc power to the stud and the workpiece. However, a single rectifier SCR18 is employed in this instance to supply the power from the main welding arc. There will be only one-third as many pulses in the main welding arc but the bridge circuit is still suitable for most applications.

Referring to FIG. 8, the modified bridge circuit here includes the same diodes as in FIG. 7. In this instance, the pilot arc is supplied by a rectifier SCR19 which supplies rectified power from the bridge including the diodes D1–D6, with the rectifier SCR19 being keyed for the entire welding cycle, as before. A resistor R14 limits the power for the pilot arc. A main rectifier SCR20 again can supply the current for the main welding arc in the same manner as in FIG. 7.

Various modifications of the above described embodiments of the invention will be apparent to those skilled in the art, and it is to be understood that such modifications can be made without departing from the scope of the invention, if they are within the spirit and the tenor of the accompanying claims.

I claim:
1. In apparatus for welding a stud to a workpiece including a welding tool having a chuck for holding a stud, means for retracting the chuck, and means for plunging the chuck toward the workpiece, circuit and power means for operating said tool comprising an alternating current source of power, first bridge means and first rectifier switch means for supplying power between the stud and the workpiece to establish a pilot arc therebetween, second bridge means including second rectifier switch means for supplying power between the stud and the workpiece to establish a main welding arc therebetween, means for initiating retraction of the stud from the workpiece and for keying a first semiconductor switch means to establish a pilot arc between the stud and the workpiece as the chuck retracts, phase control means for controlling the time in the power cycle at which said second switch means conducts to control the intensity of the main welding arc, first time delay means for operating said phase control means a predetermined time after said time delay means is operative, synchronizing circuit means including adjustable means for operating said time delay means at a predetermined time relative to the alternating current cycle, second time delay means including adjustable means for terminating operation of said phase control means and the main welding arc and for enabling the chuck to be plunged toward the workpiece, said second time delay means including additional delay means for terminating the welding arc current a predetermined period of time after the chuck begins to plunge toward the workpiece and independently of the time the stud contacts the workpiece.

2. In apparatus for welding a stud to a workpiece comprising a welding tool having a chuck for holding a stud, an alternating current power supply, bridge means including switch means for supplying rectified power between the stud held by the tool and the workpiece, to establish a pilot arc therebetween, additional switch means for supplying rectified power between the stud and the workpiece for establishing a main welding arc therebetween, control means for operating said welding tool to retract the chuck from the workpiece and to plunge the stud toward the workpiece, additional bridge means for suppling rectified power to said control means, third bridge means associated with said additional switch means, and rectifier means common to said bridge means, said additional bridge means, and said third bridge means.

3. In apparatus for welding a stud to a workpiece comprising a welding tool having a chuck for holding the stud, a three-phase alternating current power supply, bridge means including switch means for supplying rectifying power between the stud held by the tool and the workpiece to establish a pilot arc therebetween, additional switch means for supplying rectified power between the stud and the workpiece for establishing a main welding arc therebetween, second bridge means including six legs, associated with said additional switch means for supplying rectified power between the stud and the workpiece with said additional switch means including semiconductor controlled rectifiers in three of said legs in said second bridge means and phase control means for sequentially conducting said semiconductor controlled rectifiers in a predetermined sequence and at predetermined times relative to the cycles of the alternating current power supply.

References Cited

UNITED STATES PATENTS

| | | | |
|---|---|---|---|
| 2,814,716 | 11/1957 | Shoup et al. | 219—98 |
| 2,847,557 | 8/1958 | English | 219—98 |
| 3,250,891 | 5/1966 | Pease | 219—98 X |
| 3,291,958 | 12/1966 | Glorioso | 219—95 X |
| 3,346,715 | 10/1967 | Jenkins | 219—98 |
| 3,387,112 | 6/1968 | Guettel | 219—114 |
| 3,414,701 | 12/1968 | Guettel | 219—98 |

JOSEPH Y. TRUHE, Primary Examiner

R. E. O'NEILL, Assistant Examiner

U.S. Cl. X.R.

219—114